US009329973B2

(12) United States Patent
Bhuyan (10) Patent No.: US 9,329,973 B2
(45) Date of Patent: May 3, 2016

(54) METHOD AND APPARATUS FOR AUTOMATED TESTING SOFTWARE (75) Inventor: Dhiraj Bhuyan, Ipswich (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 889 days.

(21) Appl. No.: 12/293,929

(22) PCT Filed: Mar. 20, 2007

(86) PCT No.: PCT/GB2007/001028
§ 371 (c)(1),
(2), (4) Date: Dec. 24, 2008

(87) PCT Pub. No.: WO2007/107766
PCT Pub. Date: Sep. 27, 2007

(65) Prior Publication Data
US 2009/0119778 A1 May 7, 2009

(30) Foreign Application Priority Data
Mar. 22, 2006 (EP) .................................. 06251523

(51) Int. Cl.
G06F 12/14 (2006.01)
G06F 11/36 (2006.01)
(Continued)

(52) U.S. Cl.
CPC ............... *G06F 11/36* (2013.01); *G06F 9/441* (2013.01); *G06F 21/53* (2013.01); *G06F 21/55* (2013.01);
(Continued)

(58) Field of Classification Search
CPC ............. G06F 11/1417; G06F 21/568; G06F 2221/2149; G06F 21/575; G06F 21/53; G06F 11/2087; G06F 11/1435; G06F 9/441; G06F 21/566; G06F 21/55; H04L 63/1441; H04L 63/1416; H04L 63/1408; H04L 63/14; H04L 63/145; H04L 63/1433
See application file for complete search history.

(56) References Cited

U.S. PATENT DOCUMENTS 6,820,214 B1 11/2004 Cabrera et al.
2002/0103878 A1* 8/2002 Moncibais .................... 709/217
(Continued)

FOREIGN PATENT DOCUMENTS

JP 2003 202966 7/2003
WO 95/33237 11/1995
(Continued)

OTHER PUBLICATIONS

International Search Report for PCT/GB2007/001028, mailed Aug. 2, 2007.
(Continued)

Primary Examiner — Shewaye Gelagay
Assistant Examiner — Carlton Johnson
(74) Attorney, Agent, or Firm — Nixon & Vanderhye PC (57) ABSTRACT A system for discovering, or at least providing information that might assist in discovering, compromised computers involved in a malicious distributed program. The system is based around a test computer which is deliberately infected by a component of the malicious distributed program. Traffic sent by that test computer when under control of that component is recorded. More sophisticated malicious programs alter the system files or system programs on the computer which they infect—this creates a problem in that automation of the discovery process is difficult to achieve. Embodiments described here overcome this problem by running through a list of malicious program components, and in between executing (58) each one, refreshing (52, 64) the environment (system files and system programs) in which the malicious program component runs. Such techniques could be used by network operators or groups of network operators in discovering and thereafter disabling harmful distributed programs which run on computers connected to the network they operate.

8 Claims, 4 Drawing Sheets (51) Int. Cl.
*G06F 9/44* (2006.01)
*G06F 21/53* (2013.01)
*G06F 21/55* (2013.01)
*G06F 21/56* (2013.01)
*H04L 29/06* (2006.01)
*H04L 12/26* (2006.01)

(52) U.S. Cl.
CPC ............ *G06F 21/566* (2013.01); *H04L 63/145* (2013.01); *H04L 43/50* (2013.01); *H04L 2463/141* (2013.01)

(56) References Cited

U.S. PATENT DOCUMENTS

| 2003/0135791 | A1* | 7/2003 | Natvig | 714/38 |
| 2004/0003284 | A1 | 1/2004 | Campbell et al. | |
| 2004/0153718 | A1* | 8/2004 | Shen et al. | 714/5 |
| 2005/0050334 | A1 | 3/2005 | Liang et al. | |
| 2005/0080584 | A1 | 4/2005 | Bonilla | |
| 2006/0161813 | A1* | 7/2006 | Largman et al. | 714/20 |

FOREIGN PATENT DOCUMENTS

| WO | 95/33237 | 12/1995 |
| WO | 00/05650 | 2/2000 |
| WO | 03/014932 | 2/2003 |
| WO | 2005/008457 | 1/2005 |

OTHER PUBLICATIONS

Marko Helenius, "Automatic and Controlled Virus Code Execution System" Eicar Conference, 1995, 1-8, XP002412872.

Steve R. White et al. "Anatomy of a Commercial-Grade Immune System" Jun. 1999, XP002310183.

Marko Helenius, "Automatic and Controlled Virus Code Execution System", EICAR Conference '95 (8 pgs.).

"DART—An Automated Diagnostic Analysis Routine Tester", IBM Technical Disclosure Bulletin, vol. 34, No. 10B, Mar. 1, 1992 (4 pgs.).

Peter A. Vogel. 1993. An integrated general purpose automated test environment. *SIGSOFT Softw. Eng. Notes* 18, 3 (Jul. 1993), 61-69 (9 pgs.).

Steve R White et al, "Anatomy of a Commercial-Grade Immune System", Jun. 1999—retrieved online Nov. 23, 2012 from http://www.research.ibm.com/antivirus/SciPapers/White/Anatomy/anatomy.html (27 pgs.).

Robert Vibert, "A Day in the Life of an Anti-Virus Lab", online article—Jun. 17, 2000 (7 pgs.).

Garfinkel, Tal et al., "Compatiblity is Not Transparency: VMM Detection Myths and Realities", USENIX Workshop on Hot Topics in Operating Systems (HotOS), May 2007 (6 pgs.).

* cited by examiner

METHOD AND APPARATUS FOR AUTOMATED TESTING SOFTWARE

This application is the U.S. national phase of International Application No. PCT/GB2007/001028filed 20 Mar. 2007 which designated the U.S. and claims priority to EP 06251523.4 filed 22 Mar. 2006, the entire contents of each of which are hereby incorporated by reference.

BACKGROUND AND SUMMARY

The present invention relates to a system and method for investigating the effects of malicious software programs on a computer system. In some cases knowledge of those effects can directly identify computers compromised by the malicious software—for example where the effect is the sending of a message from one compromised computer to another compromised computer's address.

The invention has particular utility in relation to so-called 'botnets'—a botnet being a network of compromised computers that can be remotely controlled by an attacker through some predefined communication channel to carry out some malicious act on other computers accessible to the compromised computers. Examples of such malicious acts include sending spam e-mail, phishing, carrying out a distributed Denial of Service attack, port scanning—i.e. seeking other computers which an attacker is able to compromise.

A computer becomes part of a botnet when it gets infected by a component of a malicious distributed program (that component often being called a software robot or "bot"), which can be remotely controlled by an attacker, mostly to instigate malicious activities on the Internet.

Studies carried out by various research groups show the presence of hundreds and thousands of such compromised computers across the Internet. The sheer presence of such a large number of bots poses a serious threat to the Internet community. There have already been a number of well-documented incidents where a large group of bots have been used to launch Distributed Denial of Service (DDOS) attacks against corporate networks. Research carried out by various bot activity-monitoring groups also indicates that in recent months there has been a shift towards using these bots and botnets for extortion.

The threat posed by bots and botnets is real and serious. As such, telecom operators and Internet service providers across the globe are looking at ways and means to clean up their network and place detective and preventive mechanisms to counter the threat posed by botnets.

Given the scale of the problem presented by malicious distributed programs such as botnets there is a need to provide a method of discovering botnets which is rapid and involves as little labour as possible.

According to a first aspect of the present invention, there is provided a method (by executing a computer program stored on a computer readable medium) of investigating the effects of malicious software on a distributed computer system comprising a plurality of interconnected computers including a test computer, said method comprising the steps of
a) storing a plurality of local components of respective distributed malicious programs;
b) trialling each of said plurality of local components in turn by:
 i) running, on said test computer, an execution environment program to provide an execution environment for said local component;
 ii) running, in said execution environment, said local component; and
 iii) recording messages generated by said test computer when under control of each of said local components for transmission to one or more computers involved in the malicious distributed program of which said local component forms a part; and
c) automatically replacing said execution environment with a clean copy thereof in between each trial.

It is to be noted that automatically here means that the test computer is programmed to replace the execution environment after each trial.

It is to be noted that the word 'component' is to be understood in its broad sense of 'a part of' rather than being given a narrower meaning sometimes used by computer programmers—namely a re-usable part of a program whose services are made available to future programmers via a predefined interface.

In some embodiments, said computer system comprises a single computer, said recording step comprising recording the system files on said test computer following the running of said malicious program.

This allows the effects of the malicious software on persistently stored files (which might be programs) to be found. Doing this provides a means of testing for the presence of the malicious software on other computers in the future.

Like other application programs, bots will normally only run in the execution environment for which they are written (as used in this specification the term execution environment means an operating system program, or a program which emulates an operating system program). Operating system programs offer a programmer a means for running programs, organising file systems, and controlling I/O devices such as network cards and printers. A problem arises in that bots will often amend the operation of the operating system or system files, thereby preventing other bots from running normally or at all.

By programming a test computer to automatically run through a list of bots, run each bot and monitor the messages it generates for other computers in the botnet, and to refresh the execution environment before running the next bot in the list, a method of automatically monitoring messages generated by bots which can run through a list of bots whilst requiring little or no user intervention is provided.

The messages generated by the test computer might contain some indication of the computer(s) to which they are intended to be sent. In that case, the messages can thus be analysed to identify one or more other computers running the malicious distributed program. In cases where the operation of the distributed malicious program is controlled via a central computer, the messages might reveal the identity of that computer.

In some embodiments, said execution environment program comprises an operating system emulation program running on top of said test computer's operating system program.

In these embodiments, a plurality of instances of operating system emulation programs can be run simultaneously (using the pseudo-parallelism offered by most modern operating system programs). However, a programmer writing a bot could quite easily have it detect when it is run in an emulated environment, and program it to function abnormally or not at all in that case.

To address this problem, in other embodiments, said test computer is a dual boot computer, said execution environment program is a first operating system program executable by said test computer, and said replacement step comprises:
a) re-booting the computer to run a second operating system;

b) running a refresh program on top of said second operating system program to replace said first operating system program with a clean copy thereof;

c) configuring said boot loader program to load said first operating system program when said test computer is re-booted; and d) re-booting said test computer.

According to a second aspect of the present invention, there is provided a system for monitoring messages transferred between computers involved in a malicious distributed program, said system comprising:

a test computer;

a repository accessible to said test computer, said repository storing local components of respective malicious distributed programs executable to cause a computer to co-operate with one or more other computers in carrying out some malicious act;

a program store accessible by said test computer, said program store storing a clean copy of an execution environment program runnable on said test computer;

said test computer being arranged in operation to carry out the following steps for each of said local components in said repository:

a) load and run an execution environment for said local component;

b) run said local component in said execution environment; and c) refresh said execution environment program by re-loading it from said program store;

means for monitoring messages generated by said computer whilst under the control of said local components.

It is to be understood that 'system' as used in this document means a physical apparatus, as opposed to a method for achieving a given end.

By having a test computer load and run an execution environment, load a bot from a bot repository, and then run that bot in that execution environment, and thereafter replace that execution environment with a clean copy from a program store before loading and running the next bot from the bot repository, whilst monitoring messages generated by said test computer, a method of monitoring messages produced by a plurality of bot programs which does not require time-consuming and expensive intervention by skilled IT personnel is provided.

In some embodiments, said execution environment comprises an operating system program, whereas in other environments said execution environment comprising an operating system emulator.

In preferred embodiments, said system further comprises a network to which said test computer is connected, and said monitoring means comprises a computer also connected to said network and arranged in operation to monitor traffic on said network.

This has the advantage that the monitoring of the messages is less likely to be detected by the bot and result in the bot stopping or altering its operation.

BRIEF DESCRIPTION OF THE DRAWINGS

Specific embodiments of the present invention, given by way of example only, will now be described with reference to the accompanying Figures in which.

DETAILED DESCRIPTION OF PRESENT EXAMPLE EMBODIMENTS

Figure 1:
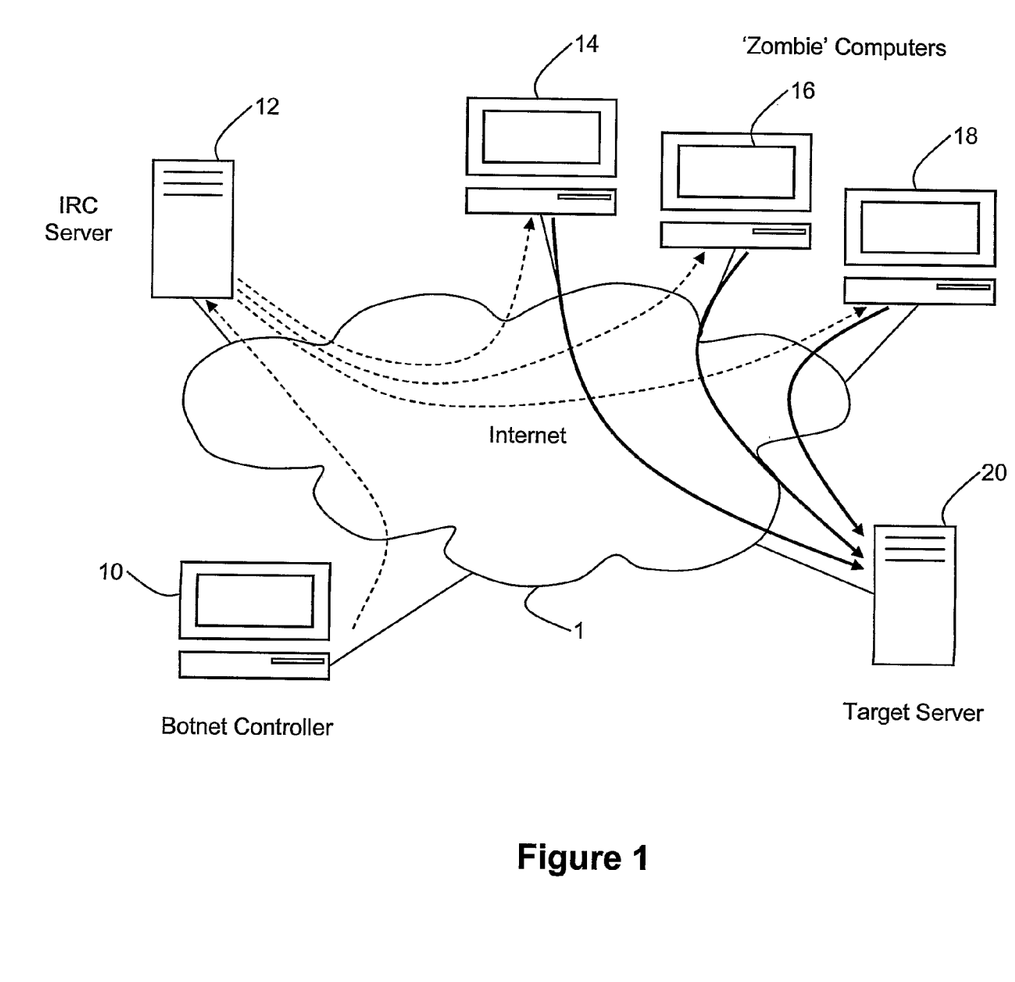
FIG. 1 illustrates the operation of a botnet when controlled to deliver a distributed Denial of Service attack on a target web-server.

Turning firstly to FIG. 1, it is well known that the global Internet 1 interconnects millions of computers. Amongst those computers are groups of computers that form respective botnets. A botnet often comprises a botnet controller computer 10, which has a communication channel to a proliferation computer 12 which in turn has communication channels with a number of zombie, or compromised, computers 14, 16, 18. When used to launch a distributed Denial of Service attack, for example, the bots running on the zombie computers can be run and send a large number of requests for web-pages to the target server 20. Normally, the number of zombie computers will be very large, and the botnet can therefore generate more web-page requests than the web-server 20 can handle, and thus deny service to those legitimately trying to access the web-server. Where the web-server offers the online sale of goods, or gains revenue through including advertising on its web-pages, this can cause significant financial loss to any company which serves web-pages from the targeted server. The user of the botnet controller computer uses the threat of such a distributed Denial of Service attack to extort money from such companies.

In more complex botnets, the zombie computers 14, 16, 18 might connect to the botnet indirectly via a proxy computer. In that case, embodiments of the present invention might find the address of the proxy computers rather than the proliferation server 12.

To build the botnet, the botnet controller first loads a bot onto as many computers as possible. This is typically done via the Internet using trojan horses, malicious programs disguised as legitimate e-mail attachments, infected file downloads (normally from peer to peer networks), from visiting malicious web pages that exploit web browser vulnerabilities to install the bot code, remotely exploitable system vulnerabilities, worms, viruses and many more. Different botnets operate in different ways, but to be useful for extortion, the botnet controller, even after infection, must be able to control whether (and perhaps when) the zombie computers are activated to participate in a distributed denial of service attack. A botnet which allows the controller to specify the target computer after infection can be used by the attacker to threaten a plurality of targets—thereby providing the controller with plural opportunities for extortion from a single botnet.

In general, botnets can be made more useful to the attacker the more communication from the botnet controller is involved in their operation.

In the present example, it is assumed that the attacker interacts with a botnet controller computer 10 to send one or more launch messages to an Internet Relay Chat (IRC) server 12 which responds by sending one or more launch messages to the many zombie computers 14, 16, 18. However, as botnets become more complex and the individuals and organisations that control them seek to evade detection, a range of communication channels other than Internet Relay Chat will be used. It should be noted that the present embodiments would be equally capable of monitoring botnet messages communicated using some other communication protocol, for example VoIP, DNS, peer to peer (p2p) network protocols, and HTTP.

Some embodiments of the present invention involve constructing a controlled environment within which the bot binaries will be stored and then executed in an orderly fashion. This controlled environment is necessary in order to ensure that—

Bot activities like scanning, spamming, participating in distributed denial of service attacks etc. as an outcome of running the bot codes are contained or slowed down (by firewalling or rate limiting the outbound traffic).

All IRC traffic generated by a bot is captured and logged. It should be possible to relate captured IRC traffic to a specific bot binary that generated the traffic. This will simplify any future analysis.

IP addresses of the IRC servers or proxies that the bots connect to are captured and logged.

There are many different ways of building this "controlled environment", using a variety of tools and techniques like passive network taps, monitoring ports on routers and switches (e.g. SPAN ports on Cisco routers), VLANs etc.

Figure 2:
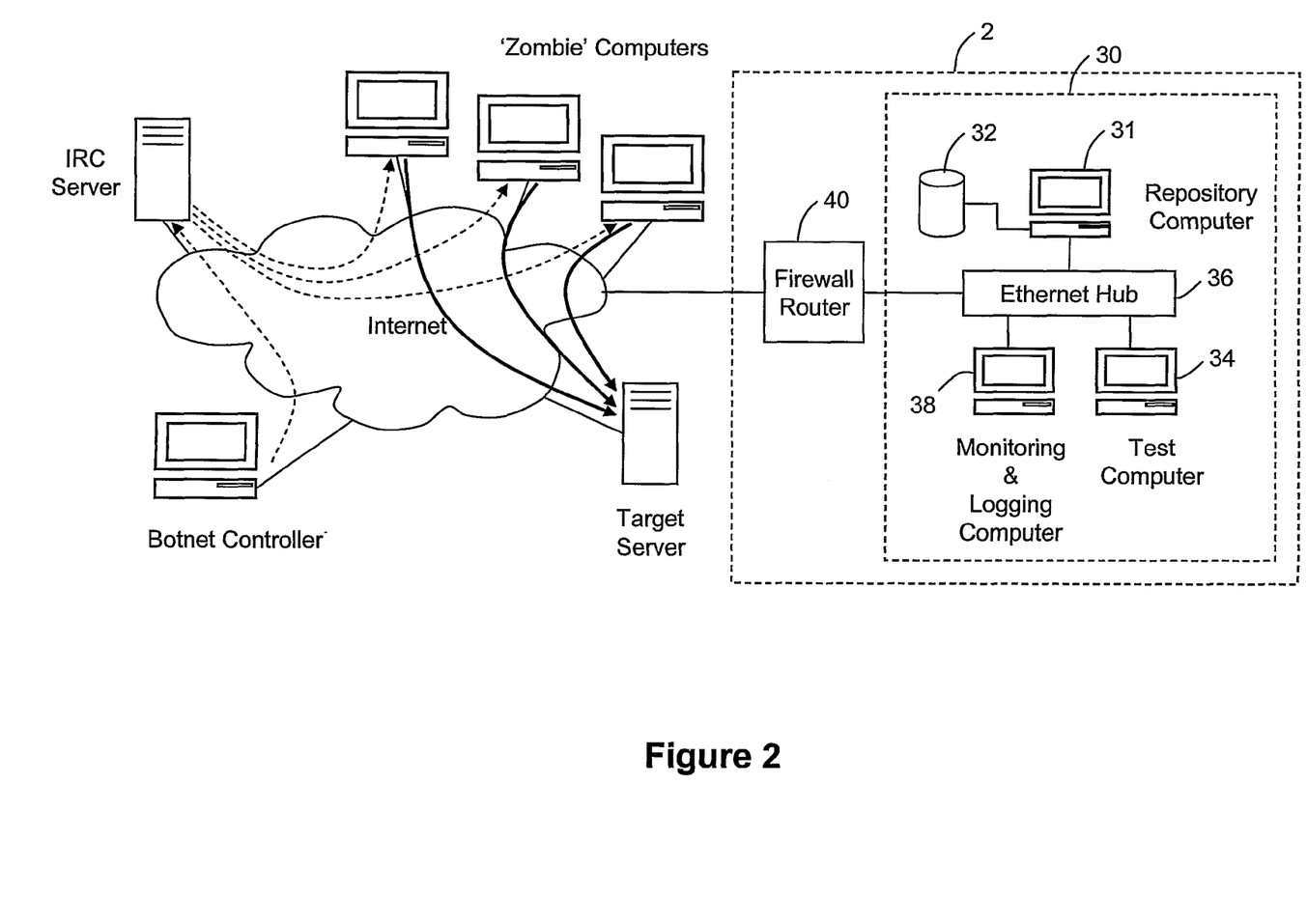
FIG. 2 illustrates the hardware employed in first and second embodiments of the present invention.

FIG. 2 shows how an example of such a "controlled environment". In this particularly described embodiment, the "controlled environment" comprises a system 2 connected to the global Internet which system runs bots in order to monitor messages used in the operation of a botnet which involves that bot.

The system 2 of the present embodiment comprises a local area network 30 and a firewall router 40 which connects the local area network 30 to the Internet. A repository computer 31, a test computer 34 and a monitor computer 38 are all connected to the local area network 30. In the present embodiment, the local area network connections are provided by an Ethernet hub 36.

The repository computer 31 stores a plurality of executable bot programs on its hard disk 32. The prevalence of Windows operating systems on personal computers means that most bot programs are written to run on computers running Windows operating systems, so the hard disk in practice stores a plurality of .exe files.

Since bot binaries disguised as legitimate email attachments are one of the most popular means used by bot writers to infect computers with bots, spam filters can be a good source for bot binaries. Other bot executable files can be collected by other manual, semi-manual or automated bot detection utilities such as antivirus software and bot identifying scanners. These desktop protection tools can be programmed to securely upload bot binaries to persistent memory whenever they are detected on a computer.

Using such collection techniques, a plurality of bot .exe files are stored in the bot repository 32.

The firewall router 40 is configured to both rate-limit and firewall the messages sent from the local area network 30. This limits or stops bot activities like scanning, spamming, participating in distributed denial of service attacks etc. as an outcome of running the bot programs on the test computer 34.

The traffic monitoring and logging computer 38 runs a Linux operating system. An IRC server can be configured to run on almost any standard or non-standard port number and for this reason port based filtering techniques do not reliably identify IRC traffic. Hence, in the present embodiment, an application layer traffic analyzer program is installed on the traffic monitoring and logging computer 38. Under the control of that program, the traffic monitoring and logging computer 38 listens promiscuously to all packets transmitted across the network 36, looks inside the payload of the captured packets and records messages having characteristics specified by the user.

A range of commercial as well as open source tools can be used for the purpose of monitoring IRC traffic on the network 36. The application layer traffic analyzer program chosen in this particular instance is the open source "Snort Intrusion Detection System" (www.snort.org). It detects IRC messages and logs them by storing as records in a predetermined format in a file—each record including a timestamp indicating the time at which it was transmitted across the network 36.

The Snort program is configured to filter out the "JOIN" and "PRIVMSG" IRC messages using the following commands.

alert tcp $HOME_NET any->any any (msg: "IRC Traffic—JOIN"; content: "JOIN #";)

alert tcp $HOME_NET any->any any (msg: "IRC Traffic—PRIVMSG"; content: "PRIVMSG #";)

Note that "$HOME_NET" refers to the local area network 36. Once configured using the above commands, Snort will raise an alert whenever a packet containing the "JOIN" and "PRIVMSG" messages is sent over the local area network 36. These alerts are stored in a file (the location and name of which the user may specify as part of the configuration of the Snort program). In the present embodiment, a Perl script runs on the monitoring and logging computer 38 which reacts to a change in the alert file by extracting the remote host address field (i.e. the address of the IRC server or proxy that the bot is trying to connect to)—something which is easy to do given the standard format of the Snort alerts.

It is to be noted that utility programs such as "swatch" or "logwatch" could instead be used to monitor the Snort log file for new alerts.

In a variation of this second embodiment, a front-end tool for Snort called ACID is also installed and executed on the traffic monitoring and logging computer 38, together with a database management system program. This allows the Snort alerts to be stored in a SQL database. If these additional programs are used then the user is able to browse through the SQL database for new alerts via the ACID web interface or use his or her own SQL commands to extract the address of the IRC server.

Figure 3:
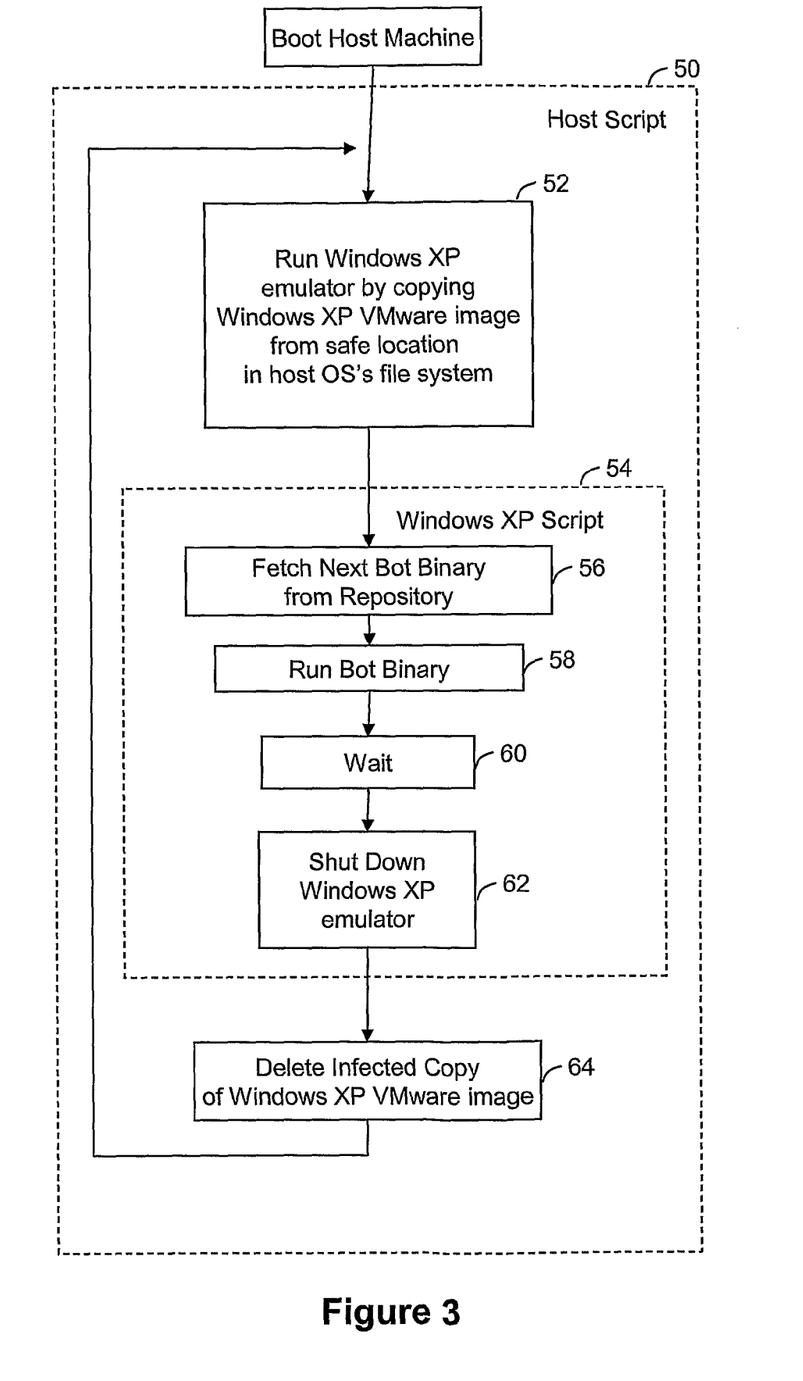
FIG. 3 shows the operation of a test computer in a first embodiment.
Figure 4:
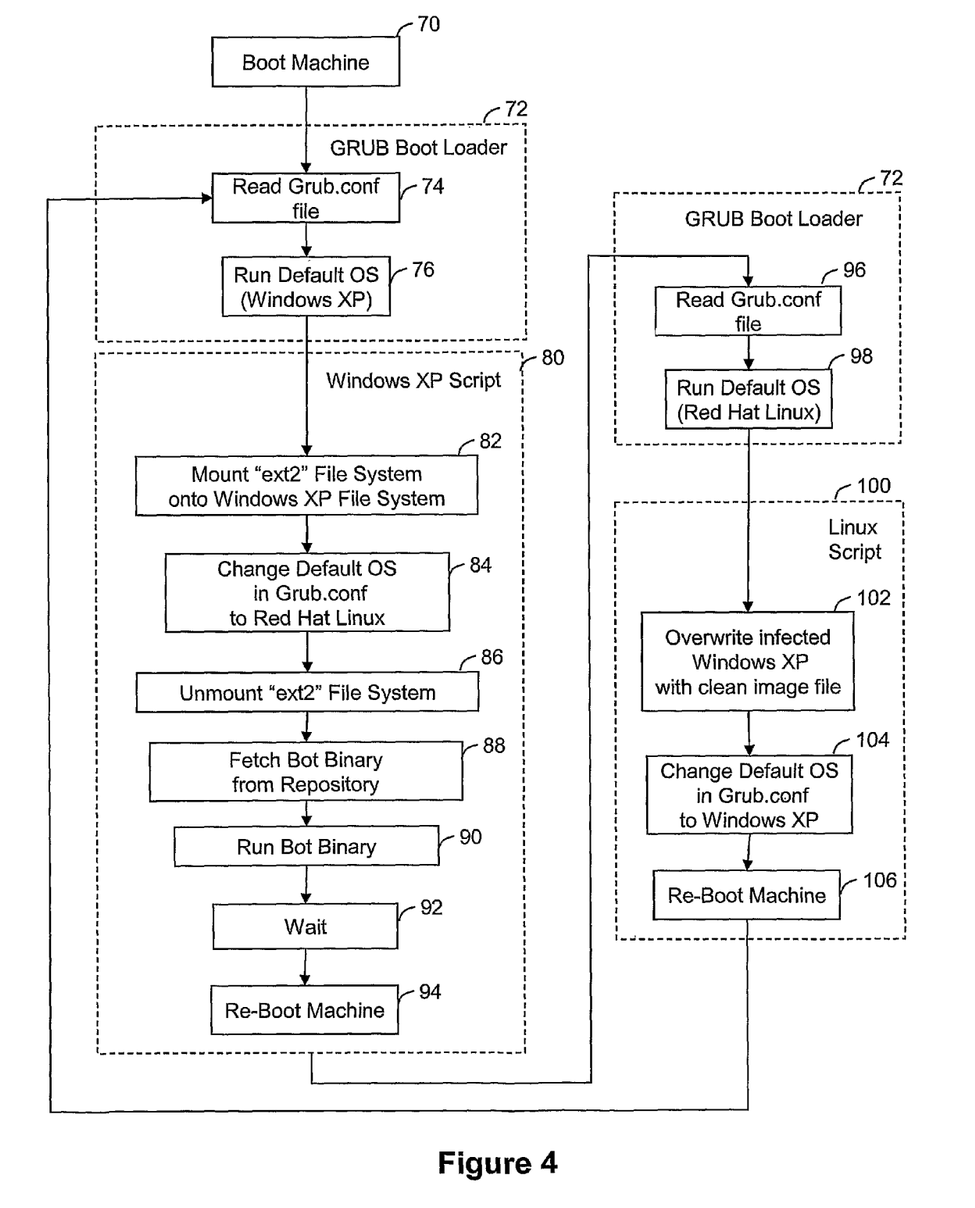
FIG. 4 shows the operation of a test computer in a second embodiment.

In a first embodiment, software is installed on the test computer 34 which controls that computer to carry out the steps shown in FIG. 3. The operation of test computer 34 in accordance with a second embodiment is shown in FIG. 4. The programs illustrated in FIGS. 3 and 4 do not simply involve running a script which repeatedly downloads bot binaries from the repository computer's hard disk 32 and executes them. There are a number of reasons for this:

Once the system gets infected by a bot, as part of its normal activity, the bot may modify system and user files, download and install new software, patch the system and make it impossible for other bots to run within the same environment.

If the system is not cleansed at some point, all the bots still running on the system will be generating traffic, triggering the monitoring computer 38 to capture the same IP address repeatedly as the bots disconnect from and reconnect to the IRC servers.

Moreover, unless removed, the bots will carry on with their normal scanning, spamming, DDoS and phishing activities. Clearly, it is not desirable for the system 2 to be used as a launch pad for malicious activities.

A mechanism is therefore needed that will automatically clean up the system after a bot binary has been executed and it has generated enough traffic for the monitoring system to trigger an alert. Although antivirus tools or bot scanners can be used to clean the system, they will be of limited use, as they will probably not be able to detect recently released bots, and even if they are able to detect them, they may not be able to take the system back to the pre-bot-execution state.

FIGS. 3 and 4 show two different ways of automatically getting a system infected by a bot and later cleaning it up for the next round of infection. The test computer 34 can use any standard or non standard protocol to download these bot binaries from the repository, as long as there is a process to log these downloads for future analysis—for example the time of download, address of the machine that downloaded a specific bot binary etc. In our example, we use an Apache web server and Perl scripts on the repository machine to facilitate the download of bot binaries using command line download tools such as "wget" that uses HyperText Transfer Protocol as the communication protocol.

In a first embodiment (FIG. 3) VMware Workstation 5.5—a program available from VMware Inc of 3145 Porter Drive, Palo Alto, Calif. 94304, U.S.A.—is installed on the test computer 30 and run. This provides a VMware virtual environment to run a Windows (98/2000/XP/other) virtual machine that will automate the bot download and infection process.

Before starting the system, a clean copy of the Windows VMware image file, which is already configured with all the necessary tools and scripts to carry out the automation, is stored in a safe location on hard disk of the test computer 30 using the file system of the host operating system program (OS) running on the test computer 30.

Once the test computer 30 is booted up, a script 50 on the host OS is run. This script first creates (step 52) a new instance of the Windows virtual machine using a clean copy of the Windows VMware image file using the following command
vmware-x-q vmware-image-folder/windows-vmware-image.vmx The "-x" option configures the VMware Workstation 5.5 program to power up the guest OS when the virtual machine is opened and the "-q" option tells it to quit when the virtual machine is powered off.

The Windows virtual machine is configured to automatically log on as the local Windows Administrator on boot without prompting the user for a password. Once Windows Virtual Machine (VM) is up and running, a startup script 54 within this Windows VM host downloads (step 56) a bot binary from the repository 32 by calling a "Perl-CGI" script using the command line "wget" tool. The Perl-CGI script picks up the first available bot binary from a list of binaries that are yet to be executed, sends it back to the virtual machine, updates the bot list and logs the download—i.e. stores a record which includes an identifier of the bot, and a timestamp indicating when the bot was downloaded. Once the virtual machine has received this bot binary, the script executes it (step 58). The bot is then allowed to run for a while (step 60). The bot traffic generated in this process will be captured by the monitoring computer 38 as discussed above and the IRC server address and port number logged. The start-up script 54 then shuts down the virtual machine after a predefined number of hours. In a preferred variation of the first embodiment, a communication channel between this virtual machine and the monitoring computer 38 can be set up so that the virtual machine can be instructed to shut down the moment the monitoring computer 38 has captured the address of the IRC server.

It is possible to associate the messages captured by the traffic monitoring and logging computer 38 with a particular bot, by comparing the log file stored on the repository computer 32 with the log file stored on the monitoring and logging computer 38.

When the virtual machine shuts down, the script 50 on the host OS deletes (step 64) the bot infected copy of the Windows VMware image and replaces it with the original clean copy. It then starts another new instance of the Windows virtual machine. This process continues repeatedly in a loop, revealing new botnets.

As it is possible to run more than one virtual machine on a single host operating system, in some embodiments multiple bot infection processes are run in parallel on the test computer 30 by launching multiple virtual machines at the same time. However the biggest problem with using VMware is that with just a few extra lines of code, a bot will be able to detect if it is running on a virtual machine. Bots with such capabilities may refuse to run in the virtual environment, meaning that no bot traffic will be generated in such cases.

FIG. 4 illustrates the operation of the test computer 30 in a second embodiment which provides an alternative method for achieving the automation that does not use a VMware virtual environment.

In the second embodiment, the test computer 30 is built as a Linux and Windows dual boot machine. As will be understood by those skilled in the art, each of the two operating systems' file systems will be located in different partitions of the test computer's hard disk. Within the Linux file system, a clean image of the original Windows partition is stored in a safe location.

The test computer 30 is provided with a copy of "Grub", a so-called boot loader, which comes with almost all well-known variants of Linux, and allows a user to choose between Windows and Linux OS when the computer is powered on. The Grub configuration file "grub.conf" is located in the "/boot/grub/" folder of one of the Linux partitions. In the present case, the configuration file is set as follows:

default=1
timeout=10
title Red Hat Linux (2.4.7-10)
   root (hd0,1)
   kernel/vmlinuz-2.4.7-10 ro root=/dev/hda3
title Windows XP
   rootnoverify (hd0,0)
   chainloader+1

The "default=1" in the above configuration file tells Grub that the default operating system to be booted to is "Windows XP". Instead, if the default field was set to zero i.e. "default=0" then it would boot "Red Hat Linux (2.4.7-10)" by default. The "timeout" field tells Grub how long (in seconds) it should wait for user input before booting into the default operating system.

In the second embodiment, the test computer is then operated as shown in FIG. 4.

On powering up the test computer 30 (step 70), control will be passed from the Basic Input Output System to the Grub boot loader 72.

Since Grub is initially configured to boot from Windows by default, Grub will read the above configuration file (step 74) and load (step 76) the Windows operating system (assuming that there is no human intervention). The Windows OS is configured to log on to the Administrator account without being prompted for a password. Once Windows is up and running, a startup script 80 then mounts (step 82) the Linux "ext2" file system using the "ext2fsd" (http://sourceforge.net/projects/ext2fsd) open source driver. The grub configuration file is then modified (step 84) to change the value of the "default" field so that Grub boots to Linux by default next time. The Linux file system is then unmounted (step 86). Once this is completed, similar to the VMware solution, the script 80 then uses the "wget" tool to download (step 88) the bot binary from the repository by calling the "Perl-CGI" script on the repository computer 31. Having downloaded the bot, the test computer 30 then executes it (step 90). After waiting (step 92) a certain period of time or on receiving a "reboot" instruction from the monitoring computer 38, the script 80 reboots the test computer 30. Note that it is necessary to mount the Linux file system (step 82), change the grub configuration file (step 84) and then unmount it (step 86) before downloading and executing the bot binary (step 90), so that the bot does not intentionally or unintentionally corrupt the Linux file system.

The start-up script 80 then ends by re-booting (step 94) the test computer 30.

This once again causes the Grub boot loader 72 to run, and once again, this reads (step 96) the configuration file. Because the configuration file was changed in step 84, this time Grub boots (step 98) into Linux by default. A Linux script 100 then overwrites (step 102) the existing bot infected Windows partition with the clean image file stored when the test computer was set up. The overwriting step (step 102) is performed using the Linux "dd" tool. The grub configuration file is then changed (step 104) to boot from Windows by default. The Linux script 100 then reboots (step 106) the test computer 34.

Using this approach, all types of bots binaries can be executed in the controlled environment 2. A drawback of this system is that only a single bot execution can take place at one time. This can be overcome by having a plurality of dual-boot test computers operating as indicated in FIG. 4 or alternatively the embodiment of FIG. 3 can be used, running a plurality of VMware virtual machines in parallel.

It will be seen how the above embodiments enable the automatic discovery of other computers operating a botnet or other malicious network of computers.

Many variations may be made to the above embodiments.

i) In the above embodiments, network traffic was analysed in order to investigate the behaviour of a computer when executing a bot. However the invention can also be used to analyse how the bot effects the operating system it runs on top of. To do this in the first described embodiment, one can save the infected copy of the Windows vmware file system in a safe location. In the second embodiment, one can create an image of the infected Windows OS partition and store it in a safe location (on the test computer itself or on a network storage device) before overwriting it with the clean copy.

ii) in the above embodiment, the controlled environment featured three separate computers (the test computer 30, the repository computer 31 and the monitoring computer 38). A more economical set-up might be achieved by using a single computer to carry out the functions of two or even all of those computers. Furthermore, the connected the controlled environment to the Internet, or even the local area network, might not be necessary—the bot binaries could instead be stored on the test computer's hard disk and the messages instead being logged by recording the instructions generated by the test computer 30 to its network card;

iii) the above embodiments used Linux and Windows operating systems. Those skilled in the art will be aware of many other operating systems which might play the role of Linux—i.e. the operating system which allows the refreshing of the Windows operating system program. Examples include FreeBSD, Suse, Gentoo, Debian, Fedora Core, Red Hat Enterprise etc.

iv) It would of course, be possible to swap the roles of the Linux and Windows operating systems (on the test computer) in order to investigate bots that run on a Linux operating system. As with Windows bots, this would enable the automation of the process of identifying other computers involved in the botnet, and monitoring the communications sent by a bot in order to find the bot's 'signature'—i.e. the pattern of messages sent by the Linux-based bot. It would also be possible to use two instances of the same operating system. For example—Windows+Windows, Linux+Linux. Linux+Windows is preferred because it is easy to protect the Linux file system from being modified (because it is necessary to mount the Linux file system before it can be written to). Nevertheless, it would be possible to use a Windows+Windows dual boot machine in a variation of the second embodiment. However, if the test computer 34 is configured to boot to one Windows partition, the other Windows partition then automatically appears as a normal windows file system which can be directly read or written to. Hence there is a possibility that the other windows partition may get corrupted while running malicious bot code. If it did get corrupted, it would not be possible to boot back to that partition and hence the process of refreshing the operating system would fail. Note that in a Windows+Windows dual boot embodiment, the "Boot.ini" file would be modified—the boot.ini file is similar to the grub.conf file and is used by the Windows bootloader to achieve the switching between the two different Windows OS's.

v) the FIG. 4 embodiment above used the Grub boot loader—other boot loader programs might be used. For example, "Lilo" which, like Grub, comes with various versions of the Linux operating system.

To summarise, the above embodiments disclose a system for discovering, or at least providing information that might assist in discovering, compromised computers involved in a malicious distributed program. The system is based around a test computer which is deliberately infected by a component of the malicious distributed program. Traffic sent by that test computer when under control of that component is recorded. More sophisticated malicious programs alter the system files or system programs on the computer which they infect—this creates a problem in automation of the discovery process is difficult to achieve. Embodiments described here overcome this problem by running through a list of malicious program components, and in between executing each one, refreshing the environment (system files and system programs) in which the malicious program component runs. Such techniques could be used by network operators or groups of network operators in discovering and thereafter disabling harmful distributed programs which run on computers connected to the network they operate.

Although the above description has concentrated on the detection and analysis of botnets, the automation technique of the present invention can in fact be used for automating the task of analysing the network traffic generated by various malwares, viruses, worms etc. For example, one can create a repository of viruses/worms/malwares and execute them one by one in the test computer. If this results in traffic being generated, it will be captured and logged. One can then use tools to analyze the generated traffic (maybe to identify traffic signatures that a specific virus/worm/malware may generate or to identify what remote vulnerabilities a virus/worm/malware is trying to exploit or to identify any specific computer on the network that the malware/virus/worm is trying to connect to). The refreshing technique will also ensure that the traffic generated by a specific virus/malware/worm can be pinpointed (if the system were not cleaned up, all the viruses/malwares running on the test system would generate their own traffic and it would be difficult if not impossible to tell which traffic was generated by which program.

The invention claimed is:

1. A method of investigating the effects of malicious software on a distributed computer system comprising a plurality of interconnected computers including a non-virtual computer, said method comprising:
   A) storing a plurality of local components of respective distributed malicious programs;
   B) trialling each of said plurality of said local components of respective distributed malicious programs in turn by:
      i) running, on said non-virtual computer, a first operating system program to provide a non-virtual execution environment for one local component of said plurality of local components;
      ii) configuring a boot loader program to load a second operating system program when said computer is rebooted;
      iii) running, in said non-virtual execution environment, said local component;
      iv) recording messages generated by said non-virtual computer when under control of each of said local components for transmission to one or more computers involved in the respective distributed malicious program of which said local component forms a part; and
      v) automatically replacing said execution environment with a clean copy of the execution environment in between each trial by:
         a) re-booting the non-virtual computer to load and run said second operating system program;
         b) running a refresh program on top of said second operating system program to replace said first operating system program with a clean copy of the first operating system program;
         c) configuring said boot loader program to load said first operating system program when said non-virtual computer is re-booted; and
         d) re-booting said non-virtual computer.

2. A method according to claim 1 wherein said first and second operating systems are different operating system programs available for said non-virtual computer.

3. A method according to claim 1 wherein the file system of the second operating system contains said clean copy of the first operating system program.

4. A system for monitoring messages transferred between computers involved in a malicious distributed program, said system comprising:
   a dual boot non-virtual computer;
   a repository accessible by said non-virtual computer, said repository storing said local components of respective distributed malicious programs executables to cause a computer to co-operate with one or more other computers in carrying out some malicious act;
   a message monitor arranged in operation to monitor messages generated by said computer while under the control of said local components;
   a program store accessible by said non-virtual computer, said program store storing a clean copy of first operating system program runnable to provide a non-virtual execution environment on said non-virtual computer;
   said non-virtual computer being arranged in operation to carry out the following steps for each of said local components in said repository:
   a) load and run said first operating system program to provide a non-virtual execution environment for said local component;
   b) configure a boot loader program to load a second operating system program when said computer is rebooted;
   c) run said local component in said non-virtual execution environment; and
   d) refresh said execution environment by:
      i) re-booting the non-virtual computer to load and run a second operating system program;
      ii) running a refresh program on top of said second operating system program to replace said first operating system program with a clean copy of said first operating system program thereof;
      iii) configuring a boot loader program to load said first operating system program when said non-virtual computer is re-booted; and
      iv) re-booting said non-virtual computer.

5. A system according to claim 4 wherein said system further comprises a network to which said non-virtual computer is connected, and said message monitor comprises a computer also connected to said network and arranged in operation to monitor traffic on said network.

6. A system according to claim 5 further comprising an internetwork router interconnecting said local area network to the global Internet.

7. A system according to claim 6 wherein said internetwork router is configured to limit the amount traffic sent from said local area network onto the global Internet.

8. A non-transitory computer readable medium which is readable by a computer, said non-transitory computer readable medium storing a computer program executable by the computer comprising:
   A) storing a plurality of local components of respective distributed malicious programs;
   B) trialling each of said plurality of said local components of respective distributed malicious programs in turn by:
      i) running, on said non-virtual computer, a first operating system program to provide a non-virtual execution environment for one local component of said plurality of local components;
      ii) configuring a boot loader program to load a second operating system program when said computer is rebooted;
      iii) running, in said non-virtual execution environment, said local component;
      iv) recording messages generated by said non-virtual computer when under control of each of said local components for transmission to one or more computers involved in the respective distributed malicious program of which said local component forms a part; and
      v) automatically replacing said execution environment with a clean copy of the execution environment in between each trial by:
         a) re-booting the non-virtual computer to load and run said second operating system program;
         b) running a refresh program on to of said second operating system program to replace said first operating system program with a clean copy of the first operating system program;
         c) configuring said boot loader program to load said first operating system program when said non-virtual computer is re-booted; and
         d) re-booting said non-virtual computer.

* * * * *